United States Patent
Mukherjee

(10) Patent No.: US 8,521,921 B1
(45) Date of Patent: Aug. 27, 2013

(54) AUTOMATIC DIRECT MEMORY ACCESS (DMA)

(75) Inventor: Pinaki Mukherjee, Austin, TX (US)

(73) Assignee: Marvell International Ltd., Hamilton (BM)

( * ) Notice: Subject to any disclaimer, the term of this patent is extended or adjusted under 35 U.S.C. 154(b) by 80 days.

(21) Appl. No.: 12/776,007

(22) Filed: May 7, 2010

Related U.S. Application Data

(60) Provisional application No. 61/180,570, filed on May 22, 2009.

(51) Int. Cl.
*G06F 3/00* (2006.01)
*G06F 13/28* (2006.01)
*G06F 13/00* (2006.01)

(52) U.S. Cl.
USPC ........ 710/28; 710/1; 710/22; 710/23; 710/33; 710/100

(58) Field of Classification Search
USPC .......................................... 710/1–28, 33, 100
See application file for complete search history.

(56) References Cited

U.S. PATENT DOCUMENTS

| | | | |
|---|---|---|---|
| 5,881,248 A * | 3/1999 | Mergard | 710/100 |
| 6,065,070 A * | 5/2000 | Johnson | 710/22 |
| 6,185,633 B1 * | 2/2001 | Johnson | 710/22 |
| 6,442,646 B1 * | 8/2002 | Tsuruta | 711/109 |
| 7,415,550 B2 * | 8/2008 | Tanaka et al. | 710/26 |
| 7,594,042 B2 * | 9/2009 | Lim | 710/23 |
| 7,797,588 B2 * | 9/2010 | Arimilli et al. | 714/51 |
| 7,895,375 B2 * | 2/2011 | Tsukamoto et al. | 710/59 |
| 8,327,082 B2 * | 12/2012 | Moyer et al. | 711/146 |
| 2005/0138235 A1 * | 6/2005 | Ali Khan et al. | 710/24 |
| 2007/0162650 A1 * | 7/2007 | Bruce | 710/22 |
| 2007/0299991 A1 * | 12/2007 | Giebel | 710/22 |
| 2009/0319604 A1 * | 12/2009 | Hatasaki et al. | 709/203 |
| 2010/0042754 A1 * | 2/2010 | Nishikawa | 710/22 |
| 2010/0064071 A1 * | 3/2010 | Shimokawa | 710/25 |
| 2010/0250811 A1 * | 9/2010 | Kawashita et al. | 710/260 |

* cited by examiner

*Primary Examiner* — Idriss N Alrobaye
*Assistant Examiner* — Getente A Yimer

(57) ABSTRACT

In one embodiment, a method includes storing, in a storage unit, a number of data transfer requests to issue for a data request signal. Data transfer requests are issued to a direct memory access (DMA) controller of a system for transfer of data to a buffer unit. The stored number of data transfer requests is determined. The issuance of data transfer requests are stopped when the stored number of data transfer requests is met.

20 Claims, 4 Drawing Sheets

ABSTRACT

AUTOMATIC DIRECT MEMORY ACCESS (DMA)

CROSS REFERENCE TO RELATED APPLICATIONS

The present application claims priority to U.S. Provisional App. No. 61/180,570 for "Auto-DMA-A solution for Avoiding Repeated Programming of DMA by Generating Exact Number of DMA Requests" filed May 22, 2009, the contents of which is incorporated herein by reference in their entirety.

BACKGROUND

Particular embodiments generally relate to direct memory access (DMA).

Unless otherwise indicated herein, the approaches described in this section are not prior art to the claims in this application and are not admitted to be prior art by inclusion in this section.

A buffer unit buffers data that is transferred between a system and an external codec (coder-decoder). The buffer unit includes a buffer where the data is temporarily stored during the transfer and also two small first in-first out (FIFO) devices placed between the buffer and the system. One of the FIFOs is for receiving data from the system to be stored in the buffer and the other one is for sending data from the buffer to the system.

A DMA controller is used to control the transfer of the data between the system and the FIFOs. The transfer of data to/from the buffer is controlled by logic that is part of or associated with the buffer. The logic generates a data request signal that is based on how much data is included in the buffer. When a data request signal is asserted, it is sent to a processor of the system, which then programs the DMA controller with information on how much data to transfer and also enables the DMA controller to transfer the data.

The FIFOs may be a receive FIFO (RX FIFO) and a transmit FIFO (TX FIFO). When the RX FIFO has space to receive more data, the RX FIFO issues a transmit request (TX request) to the DMA controller asking the system to transmit data to the buffer. Also, when the TX FIFO has room to transmit more data, the TX FIFO issues a receive request (RX request) to the DMA controller asking the system to receive data from the buffer. Logic for generating the RX or TX request operates independently from the logic that generates the data request signal. Thus, the TX FIFO or RX FIFO may be issuing TX or RX requests even when the buffer does not need to receive or send data.

One solution to limiting the TX or RX requests is to use the data request signal to indicate to the DMA controller when the TX and RX requests should be serviced. When the buffer is ready to receive data into the buffer or transmit data out of the buffer, the data request signal is asserted. The processor then programs the DMA controller with a certain number of TX or RX requests that can be serviced. For example, the DMA controller may be programmed to service 100 TX and/or RX requests. The DMA controller then services these 100 TX and/or RX requests and after the 100 TX and/or RX requests have been serviced, any further TX and/or RX requests are ignored until another data request signal is asserted. The above limits the number of TX and/or RX requests that can be serviced and does not allow a TX FIFO or RX FIFO to over-request for data transfers.

An interrupt is generated by the buffer unit to the processor when the data request signal is asserted. The processor then programs the DMA controller and enable it using an interrupt service routine. This requires some processor cycles and interrupts the processor from its normal operation.

SUMMARY

Particular embodiments generally relate to direct memory access (DMA). In one embodiment, a method includes storing, in a storage unit, a number of data transfer requests to issue for a data request signal. Data transfer requests are issued to a direct memory access (DMA) controller of a system for transfer of data to a buffer unit. The stored number of data transfer requests is determined. The issuance of data transfer requests are stopped when the stored number of data transfer requests is met.

In one embodiment, the number of data transfer requests comprises a first number. A processor programs the DMA controller to transfer a second number of data transfer requests higher than the first number of data transfer requests.

In another embodiment, an apparatus comprises: a storage device configured to store a number of transfer requests to issue for a data request signal; a buffer configured to store data; a memory configured to store data being transferred between the buffer and a system, wherein the apparatus is configured to: issue data transfer requests to a direct memory access (DMA) controller of the system for transfer of data, determine the number of data transfer requests from the storage device, and stop the issuance of data transfer requests when the number of data transfer requests is met.

In one embodiment, the apparatus is configured to: issue data transfer requests to the direct memory access (DMA) controller of the system for transfer of data, determine the number of data transfer requests from the storage device, and stop the issuance of data transfer requests when the number of data transfer requests is met.

In one embodiment, the memory comprises: a first FIFO (first in first out) memory for receiving data from the system; and a second FIFO for transferring data to the system.

In another embodiment, a system comprises a direct memory access (DMA) controller configured to respond to the data transfer requests; and a processor configured to program the DMA controller with an X number of data transfer requests in which DMA controller is limited to process, wherein the number of data transfer requests stored in the storage device of the apparatus is an N number, the X number being greater than the N number of data transfer requests.

The following detailed description and accompanying drawings provide a better understanding of the nature and advantages of the present invention.

DETAILED DESCRIPTION

Described herein are techniques for a direct memory access (DMA) system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
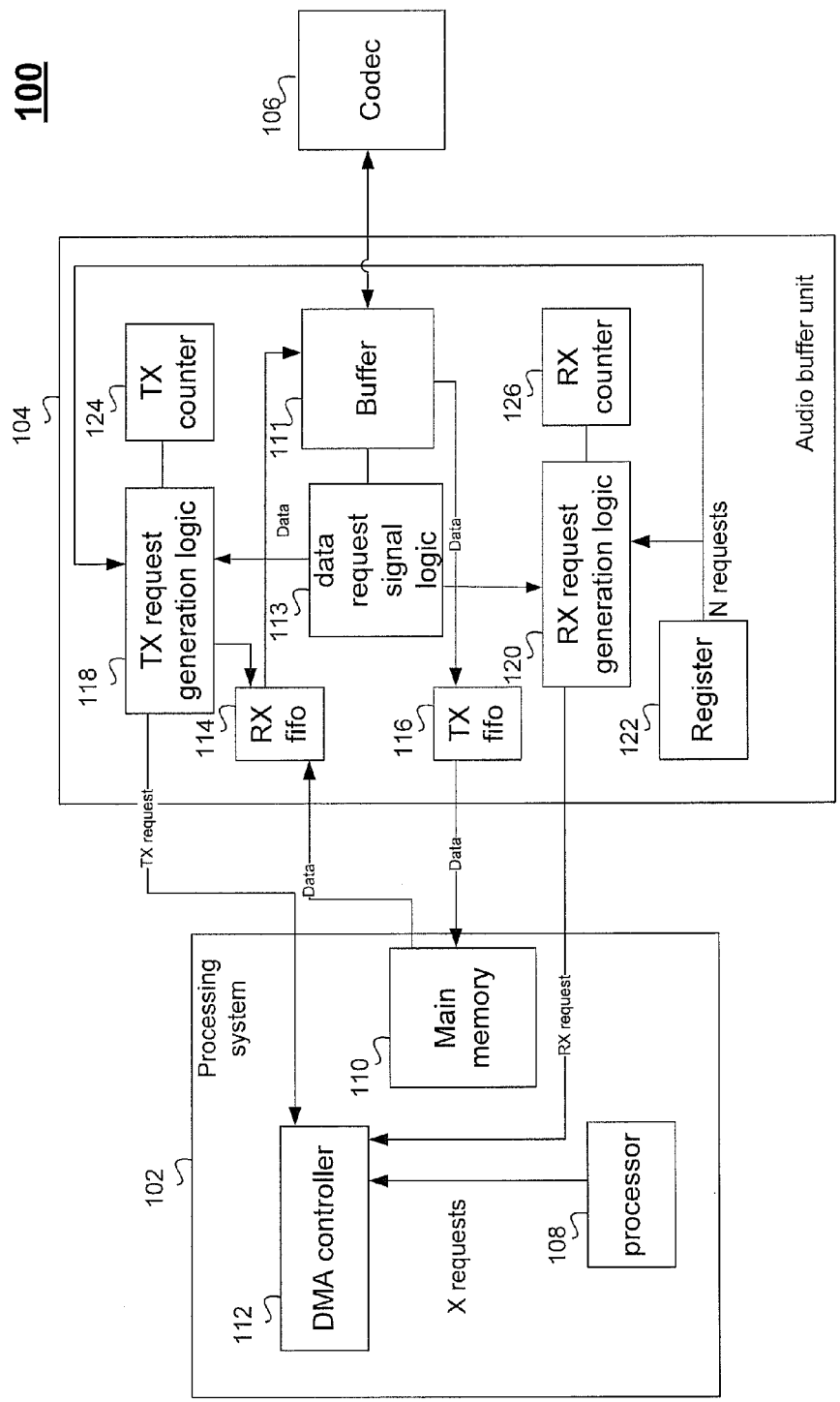
FIG. 1 depicts a system for direct memory access according to one embodiment.

FIG. 1 depicts a system 100 for direct memory access according to one embodiment. System 100 includes a processing system 102, a buffer unit 104, and a codec 106. The transfer of data between processing system 102, buffer unit 104, and codec 106 is facilitated by particular embodiments.

In one embodiment, audio data is transferred; however, particular embodiments may be used to transfer any kind of data. Particular embodiments may be used in different modes, such as a playback mode or playback-record mode. Other modes may also be used. In the playback mode, audio data, such as music data, is streamed out of buffer unit 104 to codec 106, where the data is processed and then played out through speakers (not shown). The playback mode is unidirectional (only streaming data out of buffer unit 104). The playback-record mode is bi-directional, where data is sent and received. One use is phone calls where voice data is captured through microphones (not shown) and sent to codec 106 for processing. The processed data is then streamed to buffer unit 104. Similarly, outgoing voice data goes from buffer unit 104 to codec 106, and then to the speakers.

System 100 provides direct memory access that allows reading and/or writing of data independently of a processor 108. Processor 108 may be a central processing unit (CPU) or other processor of processing unit 102. Direct memory access may transfer data between a main memory 110 and a buffer 111. Main memory 110 may be a larger memory of processing system 102. Buffer 111 may be a local memory that buffers data that is being sent in between main memory 110 and codec 106.

Buffer 111 may be a memory that is storing data. At certain points, buffer 111 may determine that it would like to transmit or receive data. For example, when buffer 111 includes an amount of data above a certain threshold, buffer 111 may want to send some of that data to main memory 110. Also, when buffer 111 includes an amount of data that is below a certain threshold, buffer 111 may want to receive data from main memory 110. To enable a data transfer, data request signal logic 113 generates a data request signal. The data request signal requests a certain amount of data to transfer. For example, the data request signal indicates that a certain amount of data is to be transferred to a receive FIFO (RX FIFO) 114 and/or from a transfer FIFO (TX FIFO) 116.

The data request signal may allow for a certain number of data transfers. A data transfer may be a burst of data. A burst of data may be any amount of data that is transferred per a data transfer, such as 32 bytes of data. Each data request signal is associated with a certain amount of bursts. For example, 100 bursts may be allowed for each data request signal that is asserted.

Before any data transfers occur, DMA controller 112 is programmed with a certain number of data transfers to allow. Processor 108 may interrupt its normal operations with an interrupt service routine to program DMA controller 112. In one embodiment, processor 108 determines a larger number of bursts in which to program DMA controller 112. For example, a multiple of the allowed number of bursts for a data request signal may be programmed. In one example, 500 bursts may be programmed in DMA controller 112 instead of 100 bursts.

The actual transfer of data is controlled by TX request generation logic 118 and RX request generation logic 120, which generate transfer requests for RX FIFO 114 and TX FIFO 116. For example, when RX FIFO 114 has space to receive more data, logic 118 issues a TX request to DMA controller 112 asking system 102 to transmit data. When logic 118 issues a TX request and it is approved by DMA controller 112, data is transferred from main memory 110 to RX FIFO 114. RX FIFO 114 may buffer the data briefly until it is transferred to buffer 111. When TX FIFO 116 has data to send to system 102, logic 120 issues an RX request to DMA controller 112 asking system 102 to receive data. Data in TX FIFO 116 is then transferred to main memory 110 when DMA controller 112 approves the TX request. TX FIFO 116 receives data from buffer 111, stores the data briefly, and then can transfer it to main memory 110. In one embodiment, a burst of data is transferred for each RX or TX request.

If DMA controller 112 is programmed with a number of allowable data transfers that is greater than what is desired for each data request signal being asserted, then conventionally it is possible that RX FIFO 114 and TX FIFO 116 may request more data transfers than 100 per data request signal. For example, conventionally, DMA controller 112 was programmed with 100 data transfers and after this number was reached, no more data transfers were allowed. However, in particular embodiments, because DMA controller 112 is programmed with a greater number (e.g., 500) of data transfers, if RX FIFO 114 and TX FIFO 116 request data transfers after the 100 requests, DMA controller 112 will allow the data transfers.

To restrict the number of data transfer requests allowed per data request signal, a number of allowable data transfer requests is stored in buffer unit 104. For example, a number, N, may be stored in a storage device, such as a register 122. The number N depends on the amount of data that needs to be transferred on each data request signal assertion. For example, the number N may be 100, which means that 100 bursts may be transferred or 100 RX requests and/or TX requests may be allowed.

When a data request signal is asserted, logic 118 and logic 120 use register 122 to determine how many requests to generate. Logic 118 and 120 are separate from data request logic 113. For example, logic 118 and logic 120 are local to RX FIFO 114 and TX FIFO 116 and data request logic 113 is local to buffer 111. However, logic 118 and 120 may receive notice that a data request signal has been asserted.

For each data signal request, N TX requests and N RX requests may be generated. In one embodiment, a TX counter 124 and an RX counter 126 may be used to determine how many TX and RX requests should be sent. For example, TX counter 124 and RX counter 126 are reset to zero when a data request signal is asserted. For every TX request that is sent by RX FIFO 114, TX counter 124 is incremented. When the counter value reaches N, the generation of TX requests stops until the next time a data request signal is asserted. RX request counter 126 also works in a similar way as it counts the number of RX requests sent by TX FIFO 116 and the generation of RX requests stops until the next time a data request signal is asserted.

By storing the number of requests allowable for each data request signal assertion, processor 108 may program DMA controller 112 for a larger number of data transfers than that are allowed for a data request signal assertion. Because RX FIFO 114 and TX FIFO 116 are restricted in the number of TX requests and RX requests they can issue per assertion of a data request signal, excess TX requests or RX requests are not sent when a data request signal is asserted. Rather, RX FIFO 114 and TX FIFO 116 regulate themselves.

Processor 108 is interrupted less because processor 108 does not need to program and enable DMA controller 112 for every data request signal assertion. For example, the data request signals may not be sent to processor 108 at all. DMA controller 112 may generate an interrupt to processor 108 when the length of data transfers has been performed and DMA controller 112 needs to be programmed again with a new number (e.g., 500).

Figure 2:
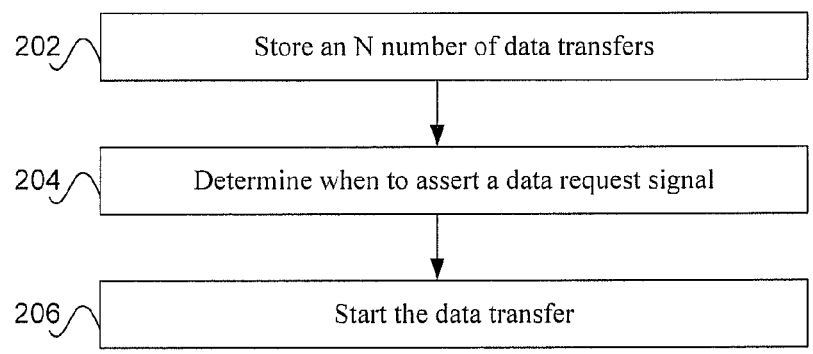
FIG. 2 depicts a simplified flowchart of method of asserting data request signals at a buffer unit according to one embodiment.

FIG. 2 depicts a simplified flowchart 200 of a method of asserting data request signals at buffer unit 104 according to one embodiment. At 202, N number of data transfers is stored in register 122. The N number may be any number of data transfers that is desired per a request signal assertion. The number may be user specified and stored.

At 204, data request logic 113 determines when to assert a data request signal. For example, pointers, such as read and write pointer values, in buffer 111 may be used to determine when to issue a data request signal. In one example, the amount of data stored in buffer 111 is used to determine when to assert the data request signal. If buffer 111 is 80% full, the data request signal may be asserted to reduce the amount of data in buffer 111 by a certain percentage, such as 20%. That 20% may be equal to an N number of data transfers.

At 206, data request logic 113 performs the data transfer. DMA controller 112 has been programmed with an allowable number of data requests and buffer unit 104 does not need to send an interrupt to processor 108 to start the data transfer.

Figure 3:
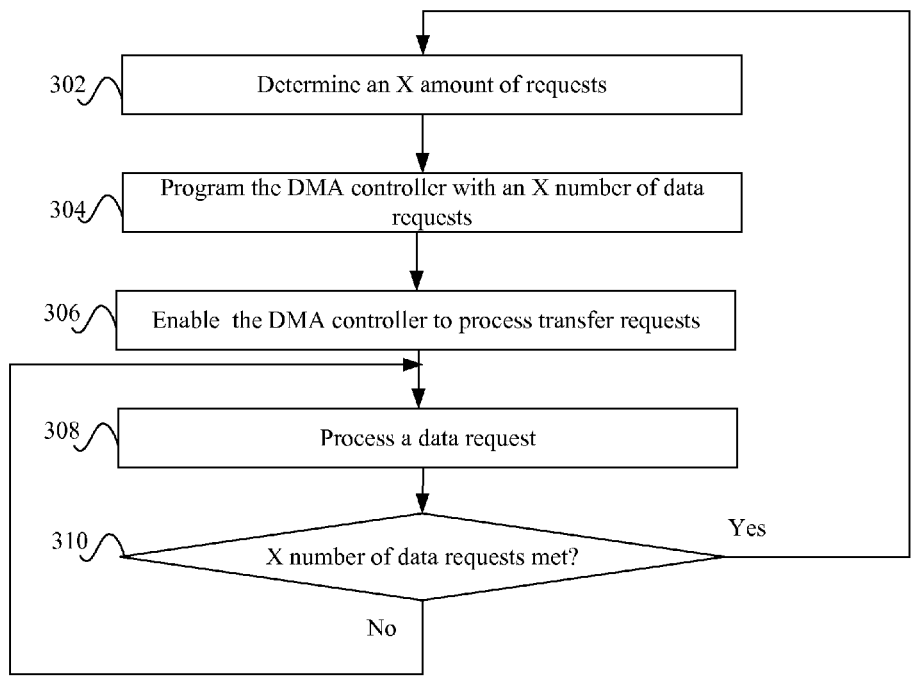
FIG. 3 depicts a simplified flowchart of a method for processing data request signals at a processor according to one embodiment.

FIG. 3 depicts a simplified flowchart 300 of a method for processing data request signals at processor 108 according to one embodiment. At 302, processor 108 determines an amount, such as an amount X, of requests, in which to program DMA controller 112. At 304, processor 108 programs DMA controller 112 with X number of data requests. At 306, processor 108 also enables DMA controller 112 to process transfer requests from RX FIFO 114 and TX FIFO 116.

At 308, DMA controller 112 processes a data request. At 310, it is determined if an X number of data requests in which DMA controller 112 was previously programmed has been met. For example, a number of data requests is counted and it is determined if X data transfers have occurred. If the X number of data transfer requests has been met, then the process reiterates to 302 where processor 108 determines an amount, such as an amount X, of requests, in which to re-program DMA controller 112. If the X number of requests have not been met, DMA controller 112 processes another data request at 308.

Figure 4:
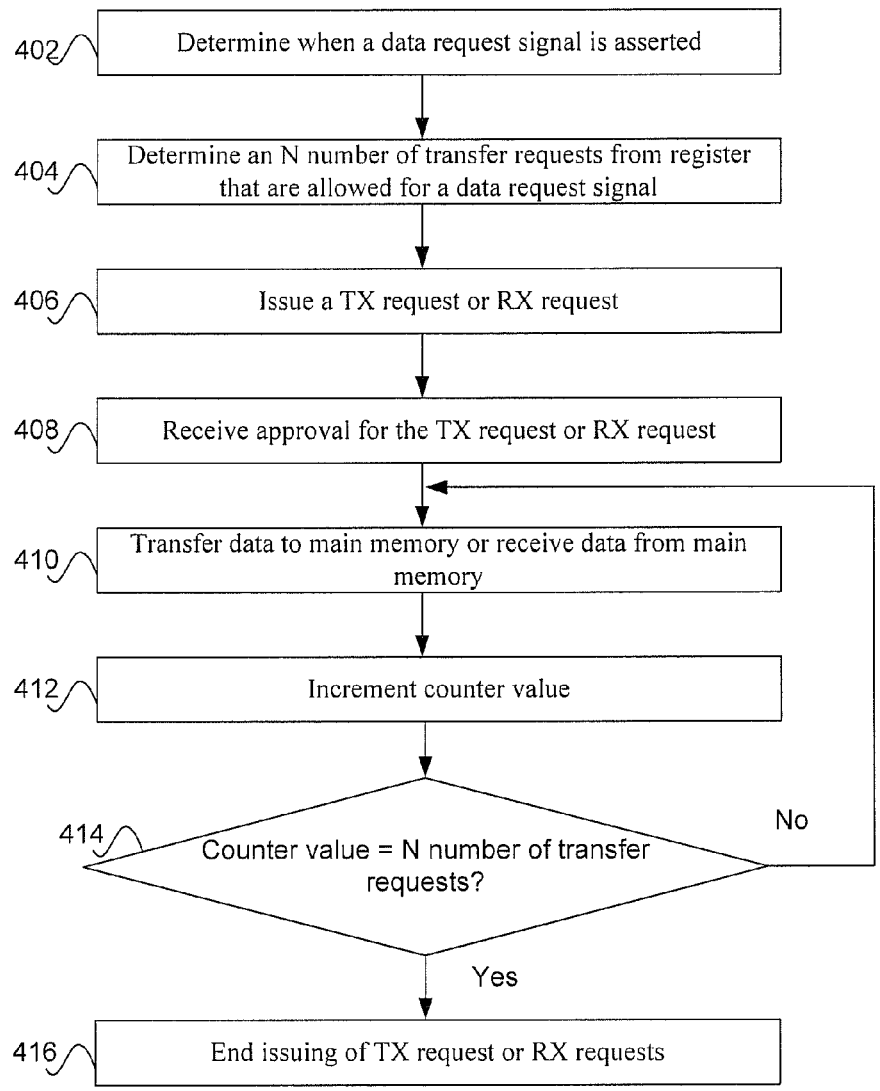
FIG. 4 depicts a simplified flowchart for sending TX requests and RX requests from an RX FIFO and a TX FIFO according to one embodiment.

FIG. 4 depicts a simplified flowchart 400 for sending TX requests and RX requests from RX FIFO 114 and TX FIFO 116 according to one embodiment.

At 402, it is determined when a data request signal is asserted. At 404, logic 118 or 120 determines an N number of transfer requests from register 122 that are allowed for a data request signal.

At 406, RX FIFO 114 or TX FIFO 116 issues a TX request or RX request. At 408, RX FIFO 114 or TX FIFO 116 receives approval for the TX request or RX request. For example, DMA controller 112 may determine if the TX request or RX request cause a number of requests to be over the allowed X requests. If not, then the TX or RX request may be approved by DMA controller 112. At 410, RX FIFO 114 transfers data to main memory 110 or TX FIFO 116 receives data from main memory 110.

At 412, a counter value is incremented for TX request counter 124 or RX request counter 126. At 414, logic 118 or 120 then determines if the counter value equals the N number of transfer requests. If not, the process reiterates to 406. At 416, if the counter value equals the number of data transfer requests, the issuing of TX request or RX requests is ended. For example, N TX requests and N RX requests may be allowed for each data request signal assertion. The TX request or RX requests are stopped until another data request signal is asserted.

Accordingly, the correct length of data to be transferred per assertion of a data request signal is programmed in buffer unit 104. The number may be programmed once or changed at a later time. Buffer unit 104 may regulate the amount of data that is requested by RX FIFO 114 and TX FIFO 116 without interrupting processor 108. This results in a greater utilization of processor 108 and better performance in processing tasks because there are fewer interrupts to processor 108. Also, the data transfers may be started sooner than if the interrupt driven approach is used because programming of registers for DMA controller 112 does not need to be done on each assertion of the data request signal. Rather, data requests may start right away.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A system comprising:
   a processor;
   a memory; and
   a direct memory access (DMA) controller configured to:
   receive an allowable number of data transmissions, the allowable number determined by the processor;
   receive a request to transfer data, the request received after the allowable number is determined by the processor;
   determine, independent of the processor, that a data transfer number associated with the request to transfer data is less than, greater than, or equal to the allowable number;
   responsive to the data transfer number being less than or equal to the allowable number, approve, independent of the processor, the request to transfer data;
   responsive to the data transfer number being greater than the allowable number, disapprove, independent of the processor, the request to transfer data;
   responsive to disapproving the request to transfer data, interrupt the processor;
   responsive to interrupting the processor, receive a new number of allowable data transmissions from the processor.

2. The system of claim 1, the DMA controller further configured to, in response to approving the request to transfer data, cause data to transfer between the memory and a buffer unit.

3. The system of claim 1, the DMA controller further configured to bypass the processor when the number of allowable data transmissions has not been exceeded.

4. The system of claim 1, further comprising:
a buffer unit comprising:
   a buffer;
   a request first in first out (FIFO) device configured to request data directly between the memory and the buffer; and
   a transmit FIFO device configured to transmit data between the memory and the buffer.

5. The system of claim 4, the buffer unit being configured to bypass the processor when the DMA controller determines that the number of allowable data transmissions has not been exceeded.

6. A direct memory access (DMA) controller comprising hardware logic, the hardware logic configured to:
   determine an allowable number of data transmissions based, at least in part, on a previously received input from a processor;
   determine, independent of the processor, that a data transfer number associated with a data transfer request is less than, greater than, or equal to the allowable number;
   responsive to the data transfer number being less than or equal to the allowable number, approve, independent of the processor, the data transfer request;
   responsive to the data transfer number being greater than the allowable number, disapprove, independent of the processor, the data transfer request;
   responsive to causing the data transfer request to be disapproved, causing the processor to be interrupted; and
   responsive to causing the processor to be interrupted, receive a new number of allowable data transmissions from the processor.

7. The DMA controller of claim 6, the hardware logic further configured to limit transfer of one or more additional data transfer requests based, at least in part, on the allowable number data transmissions.

8. The DMA controller of claim 6, the allowed number of data transmissions being further based, at least in part, on a number of data transfer requests allowed per data request signal.

9. The DMA controller of claim 8, the number of data transfer requests allowed per data request signal being stored in a buffer unit.

10. The DMA controller of claim 8, the number of data transfer requests per data request signal being determined by a buffer unit.

11. The DMA controller of claim 6, the allowable number of data transmissions being greater than a number of data transfer requests allowed per data request signal.

12. A method comprising:
   receiving an allowable number of data transfers, the allowable number of data transfers determined by a processor associated with a memory and a direct memory access (DMA) controller of the memory;
   determining, by the direct memory access (DMA) controller and independent of the processor, that a data transfer number associated with a data transfer request requesting that data be read from or written to the memory is less than, greater than, or equal to the allowable number;
   responsive to the data transfer number being less than or equal to the allowable number, approving, by the direct memory access (DMA) controller and independent of the processor, the data transfer request;
   responsive to the data transfer number being greater than the allowable number, disapproving, by the direct memory access (DMA) controller and independent of the processor, the data transfer request;
   responsive to disapproval of the data transfer request, interrupting the processor; and
   responsive to interrupting the processor, receiving a new number of allowable data transmissions from the processor.

13. The method of claim 12, the allowable number of data transfers being determined in response to the processor programming the DMA controller.

14. The method of claim 12, further comprising:
   determining that the allowable number of data transfers has been met; and
   stopping, via the DMA controller, the data transfer request based at least in part on the determining that the allowable number of data transfers has been met.

15. The method of claim 12, wherein the data transfer request comprises a transmit request or a receive request.

16. The method of claim 12, further comprising approving, via the DMA controller, a second data transfer request without interrupting the processor based on the second data transfer not exceeding the allowable number of data transfers.

17. The method of claim 12, wherein the data transfer request is received from a buffer unit.

18. The method of claim 17, wherein the DMA controller processes the data transfer request from the buffer unit without interrupting the processor for permission to transfer the data transfer request.

19. The method of claim 12, further comprising, responsive to determining the approval of the data transfer request, reading the data from the memory or writing the data to the memory.

20. The method of claim 12, wherein the new number of allowable data transmissions is greater than the allowable number of data transfers.

* * * * *